(12) United States Patent
Hahn et al.

(10) Patent No.: US 11,686,354 B2
(45) Date of Patent: Jun. 27, 2023

(54) DUAL CLUTCH TRANSMISSION

(71) Applicant: MERCEDES-BENZ GROUP AG, Stuttgart (DE)

(72) Inventors: Peter Hahn, Stuttgart (DE); Carsten Gitt, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/800,975

(22) PCT Filed: Jan. 26, 2021

(86) PCT No.: PCT/EP2021/051660
§ 371 (c)(1),
(2) Date: Aug. 19, 2022

(87) PCT Pub. No.: WO2021/164990
PCT Pub. Date: Aug. 26, 2021

(65) Prior Publication Data
US 2023/0078981 A1    Mar. 16, 2023

(30) Foreign Application Priority Data

Feb. 20, 2020    (DE) .................... 10 2020 001 094.6

(51) Int. Cl.
*F16D 21/06*   (2006.01)
*F16D 25/0638*   (2006.01)
*B60K 6/387*   (2007.10)
*F16D 25/10*   (2006.01)

(52) U.S. Cl.
CPC .......... *F16D 25/0638* (2013.01); *B60K 6/387* (2013.01); *F16D 21/06* (2013.01); *F16D 25/10* (2013.01); *F16D 2021/0661* (2013.01)

(58) Field of Classification Search
CPC ................. F16D 25/0638; F16D 25/10; F16D 2021/0661; F16D 13/385; B60K 6/387; B60K 6/547
See application file for complete search history.

(56) References Cited

U.S. PATENT DOCUMENTS

| | | | |
|---|---|---|---|
| 2011/0259698 A1* | 10/2011 | Arnold | F16D 21/06 192/48.1 |
| 2011/0266110 A1* | 11/2011 | Arnold | F16D 3/66 192/66.1 |

(Continued)

FOREIGN PATENT DOCUMENTS

| | | |
|---|---|---|
| DE | 10114281 A1 | 9/2002 |
| DE | 102005004207 A1 | 8/2006 |

(Continued)

OTHER PUBLICATIONS

International Search Report dated Apr. 12, 2021 in related/corresponding International Application No. PCT/EP2021/051660.

(Continued)

*Primary Examiner* — Jacob S. Scott
*Assistant Examiner* — Farhana Pervin
(74) *Attorney, Agent, or Firm* — Patent Portfolio Builders PLLC

(57) ABSTRACT

A dual clutch transmission includes an input shaft having a first clutch having a first input disc carrier, a first output disc carrier, a first force transfer region, and a first actuation piston. The transmission includes a second clutch having a second input disc carrier, a second output disc carrier, a second force transfer region, and a second actuation piston. A first sub-transmission includes a first sub-transmission input shaft and a second sub-transmission has a second sub-transmission input shaft. The input shaft, the first input disc carrier, and the second input disc carrier are connected to one another for fixedly conjoint rotation. The first output (Continued)

disc carrier is connected to the first sub-transmission input shaft for fixedly conjoint rotation. The second output disc carrier is connected to the second sub-transmission input shaft for fixedly conjoint rotation. The second sub-transmission input shaft is arranged coaxially with and radially surrounding the first sub-transmission input shaft.

12 Claims, 1 Drawing Sheet

(56) References Cited

U.S. PATENT DOCUMENTS

| | | | | |
|---|---|---|---|---|
| 2017/0268580 | A1* | 9/2017 | Dole | F16D 25/10 |
| 2021/0023932 | A1* | 1/2021 | Park | F16D 13/683 |
| 2021/0229544 | A1* | 7/2021 | Ortmann | B60K 6/38 |

FOREIGN PATENT DOCUMENTS

| | | |
|---|---|---|
| DE | 102005063248 A1 | 7/2007 |
| DE | 102006027899 A1 | 12/2007 |
| DE | 112007002842 B4 | 9/2009 |
| DE | 102015208372 A1 | 3/2016 |
| DE | 102017009024 A1 | 3/2019 |
| DE | 102018009392 B3 | 2/2020 |
| EP | 1800929 A2 | 6/2007 |

OTHER PUBLICATIONS

Office Action created Oct. 13, 2020 in related/corresponding DE Application No. 10 2020 001 094.6.
Written Opinion dated Apr. 12, 2021 in related/corresponding International Application No. PCT/EP2021/051660.

* cited by examiner

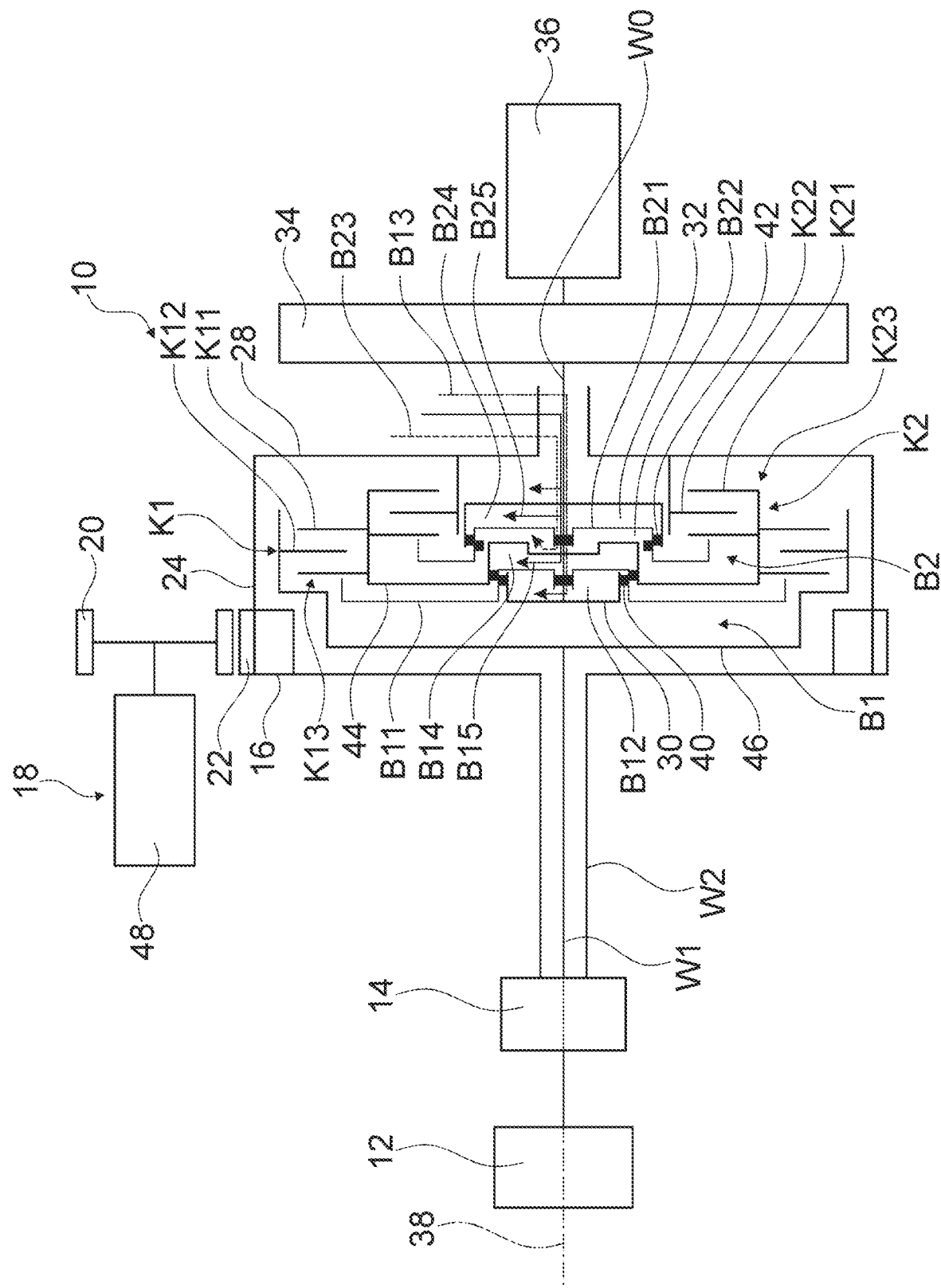

DUAL CLUTCH TRANSMISSION

BACKGROUND AND SUMMARY OF THE INVENTION

Exemplary embodiments of the invention relate to a dual clutch transmission.

Transmissions of this kind are known from documents DE 101 14 281 A1, DE 11 2007 002 842 B4, DE 10 2005 063 248 A1, DE 10 2018 009 392 B3 and DE 10 2005 004 207 A1.

DE 10 2006 027 899 A1 discloses dual clutch transmission comprising an input shaft, comprising a first clutch, which has a first input disc carrier, a first output disc carrier, a first force transfer region and a first actuation piston, comprising a second clutch, which has a second input disc carrier, a second output disc carrier, a second force transfer region and a second actuation piston, comprising a first sub-transmission, which has a first sub-transmission input shaft, and comprising a second sub-transmission, which has a second sub-transmission input shaft, wherein the input shaft, the first input disc carrier and the second disc carrier are connected to one another for fixedly conjoint rotation, wherein the first output disc carrier is connected to the first sub-transmission input shaft for fixedly conjoint rotation, wherein the second disc carrier is connected to the second sub-transmission input shaft for fixedly conjoint rotation, wherein the second sub-transmission input shaft is arranged coaxially with and radially surrounding the first sub-transmission input shaft, wherein the first force transfer region is arranged axially at least partially overlapping and radially surrounding the second force transfer region.

Dual clutch transmissions are also known likewise from EP 1 800 929 A2, DE 10 2017 009 024 A1 and DE 10 2015 208 372 A1.

Exemplary embodiments of the invention are directed to a device having improved properties in respect of a compact design and extended functionality.

The invention is based on a dual clutch transmission comprising an input shaft, comprising a first clutch, which has a first input disc carrier, a first output disc carrier, a first force transfer region and a first actuation piston, comprising a second clutch, which has a second input disc carrier, a second output disc carrier, a second force transfer region and a second actuation piston, comprising a first sub-transmission, which has a first sub-transmission input shaft, and comprising a second sub-transmission, which has a second sub-transmission input shaft, wherein the input shaft, the first input disc carrier and the second input disc carrier are connected to one another for fixedly conjoint rotation, wherein the first output disc carrier is connected to the first sub-transmission input shaft for fixedly conjoint rotation, wherein the second output disc carrier is connected to the second sub-transmission input shaft for fixedly conjoint rotation, wherein the second sub-transmission input shaft is arranged coaxially with and radially surrounding the first sub-transmission input shaft, wherein the first force transfer region is arranged axially at least partially overlapping and radially surrounding the second force transfer region.

It is proposed that the dual clutch transmission has a cylinder portion, which is connected to the second output disc carrier for fixedly conjoint rotation and is arranged radially surrounding and axially at least partially overlapping the first output disc carrier. The first force transfer region and the second force transfer region are arranged axially overlapping at least in part.

The dual clutch transmission comprises a primary rotation axis and two secondary rotation axes. Here, a "primary rotation axis" shall be understood to mean a rotation axis defined by at least one drive shaft. This shall preferably be understood to mean a rotation axis defined by a drive-side input shaft of the hybrid dual clutch transmission. A "secondary rotation axis" shall be understood to mean a rotation axis, in particular of a layshaft, arranged offset and parallel to the primary rotation axis.

In particular, the first clutch and the second clutch form a dual clutch of the dual clutch transmission. The dual clutch is advantageously designed to be powershiftable. The terms "axial" and "radial" relate to the primary rotation axis. The first clutch is formed in particular as a first multi-disc clutch. The first inner disc carrier preferably carries at least one first inner disc and particularly preferably a plurality of the first inner discs. The first outer disc carrier also carries preferably at least one first outer disc and particularly preferably a plurality of first outer discs. The at least one first inner disc and the at least one first outer disc preferably form a first disc set, particularly preferably in an alternating arrangement. The first disc set forms, in particular, the first force transfer region. A "force transfer region" shall be understood to mean, in particular, a region of a clutch in which, at least in an actuated state of the clutch, force is transferred, in particular by way of a form fit and/or frictional engagement, between an input side of the associated clutch and the output side of the associated clutch. The force transfer region is preferably formed by a region of the inner discs and the outer discs of the clutch in question. The force transfer region is formed, in particular, by a disc set. The second clutch is formed in particular as a second disc clutch. The second inner disc carrier preferably carries at least one second inner disc and particularly preferably a plurality of second inner discs. Furthermore, the second outer disc carrier preferably carries at least one second outer disc and particularly preferably a plurality of second outer discs. The at least one second inner disc and the at least one second outer disc preferably form a second disc set, particularly preferably in an alternating arrangement. The second disc set forms in particular the second force transfer region. The term "provided" shall be understood to mean, in particular, specially designed and/or specially equipped. The fact that an object is provided for a specific function shall be understood to mean, in particular, that the object fulfils and/or performs this specific function in at least one application state and/or operating state.

The first clutch and the second clutch are preferably arranged at least substantially in the same axial extension region. The expression "at least substantially in the same axial extension region" shall be understood here to mean that the first clutch and the second clutch overlap in an axial extension region to an extent of more than 75%, preferably more than 90%, and particularly preferably more than 95%. The first clutch and the second clutch particularly preferably have the same axial extension region.

The expression "connected for fixedly conjoint rotation" shall be understood in this context of two rotatably mounted elements to mean that the elements are arranged coaxially with one another and are connected to one another in such a way that they rotate with the same angular velocity. The expression "connected for fixedly non rotation" shall be understood in this context of connection of an element to a housing to mean that the element is connected to the housing in such a way that it cannot rotate relative to the housing.

A "cylinder portion" shall be understood in this context to mean a, in particular, rotationally symmetrical element having a hollow-cylindrical basic shape. The cylinder portion is preferably tubular. The cylinder portion particularly preferably has a symmetry axis running parallel to, in particular coaxially with, a primary rotation axis of the dual clutch transmission. The cylinder portion is preferably formed in one piece. The expression "in one piece" shall be understood to mean connected at least in an integrally bonded manner, for example by a welding process, an adhesive bonding process, a molding-on process, and/or another process seeming to be expedient to a person skilled in the art, and/or shall be understood advantageously to mean formed in a single piece, for example by being produced from a casting and/or by being produced in a single- or multi-component injection molding process, and advantageously from an individual blank. The cylinder portion is preferably formed as a shaped component. The cylinder portion can in principle also be formed in a number of parts. The expression "axially at least partially overlapping" shall be understood to mean that the corresponding components, assemblies, or installation spaces overlap axially at least in some regions as viewed along the primary rotation axis. Preferably, this shall be understood to mean that at least one straight line extending radially to the primary rotation axis intersects all corresponding components, assemblies, or installation spaces.

An advantageously compact and functional dual clutch transmission can be provided by the embodiment according to the invention. An advantageously high efficiency of the first clutch can be achieved. Use of the first clutch as a starting clutch of large diameter can be achieved, in particular if the starting gear is engaged via the first sub-transmission input shaft. A particularly efficient and compact arrangement of a dual clutch can be achieved. Furthermore, an advantageously economical arrangement can be achieved.

It is also proposed that the dual clutch transmission comprises, radially overlapping the first force transfer region, a connection plate connected to the second sub-transmission input shaft for fixedly conjoint rotation and extending radially starting from the second sub-transmission input shaft and which is arranged axially between the sub-transmissions and the force transfer regions. The connection plate is preferably fixedly connected, in particular in one piece, to the cylinder portion.

A "connection plate" shall be understood to mean an at least substantially rotationally symmetrical, in particular round, preferably flat, element, which is arranged coaxially with the primary rotation axis. The connection plate preferably has at least one planar region arranged perpendicularly to the primary rotation axis. In this context, "flat" shall be understood to mean in particular that a maximum axial extension of the connection plate is in particular less than 70%, preferably less than 50%, and particularly preferably less than 30% of a diameter of the connection plate. The connection plate is preferably formed in one piece. The expression "radially overlapping" shall be understood to mean, in particular, that the corresponding components, assemblies, or installation spaces overlap radially as viewed along the primary rotation axis. It shall be understood to mean, in particular, that at least one straight line extending parallel to the primary rotation axis intersects all corresponding components, assemblies, or installation spaces. The first force transfer region and the connection plate are preferably arranged at least substantially in the same radial extension region. An advantageously efficient and compact arrangement of a dual clutch can thus be achieved.

It is furthermore proposed that the second output disc carrier is embodied as an inner disc carrier. An advantageous arrangement and attachment of the clutches can thus be achieved.

It is also proposed that the dual clutch transmissions have an electric machine and an attachment element, which is connected to the second output disc carrier for fixedly conjoint rotation and which is provided for torque-transmitting attachment of the electric machine. The electric machine preferably has a rotor. The rotor preferably has a drive element provided to cooperate with the attachment element, wherein the attachment element is formed by an output element. An "output element" shall be understood to mean a gearwheel, a chain wheel, a belt pulley, or the like, which is permanently connected to at least one transmission element and/or a connection unit for fixedly conjoint rotation. The output element is provided for torque-transmitting attachment of the rotor of the electric machine to the dual clutch transmission. A "drive element" shall be understood to mean a gearwheel, a chain wheel, a belt pulley, or the like, which is provided to transfer a torque, a rotation direction and/or a speed of the electric motor. The drive element and the output element are coupled to one another. The drive element and the output element are, in particular, provided to transform a torque and/or a speed of the electric machine. An advantageously efficient and compact arrangement of a dual clutch with attachment of an electric machine to the dual clutch can thus be achieved in particular. An attachment of the electric machine to a sub-transmission for conjoint rotation can be achieved. A high $CO_2$ saving potential can be achieved by decoupling an internal combustion engine in E-operation via the dual clutch.

It is furthermore proposed that the first output disc carrier is embodied as an outer disc carrier. An advantageous arrangement and attachment of the clutches can thus be achieved.

It is also proposed that the dual clutch transmission has a second output plate, which is connected to the second output disc carrier for fixedly conjoint rotation and which is connected to the cylinder portion for fixedly conjoint rotation and which is arranged axially on a side of the second force transfer region facing away from the sub-transmissions. The second output plate is preferably arranged radially overlapping the first and second force transfer region. An "output plate" shall be understood to mean an at least substantially rotationally symmetrical, in particular round, preferably flat element, which is arranged coaxially with the primary rotation axis. The output plate preferably has at least one planar region arranged perpendicularly to the primary rotation axis. In this context, the term "flat" shall be understood to mean in particular that a maximum axial extension of the output plate is in particular less than 70%, preferably less than 50%, and particularly preferably less than 30% of a diameter of the output plate. The output plate is preferably formed in one piece. The output plate is preferably formed as a shaped component. The output plate can, in principle, also be formed in a number of parts. In particular, an advantageously efficient and compact arrangement of a dual clutch can thus be achieved.

It is furthermore proposed that the dual clutch transmission has a first output plate arranged coaxially with the input shaft, and by means of the first output plate the first output disc carrier is connected to the first sub-transmission input shaft for fixedly conjoint rotation, wherein the first output plate is arranged axially between the sub-transmissions and the first force transfer region. The first output plate is preferably arranged axially between the connection plate and the first force transfer region. An advantageously efficient and compact arrangement of a dual clutch can thus be achieved.

It is also proposed that the dual clutch transmission has a first input plate arranged coaxially with the input shaft, and by means of the first input plate the first input disc carrier is connected to the input shaft for fixedly conjoint rotation, wherein the first input plate is arranged axially between the sub-transmissions and the first force transfer region. The first input plate is preferably arranged axially between the first output plate and the second force transfer region. An "input plate" shall be understood to mean an at least substantially rotationally symmetrical, in particular round, preferably flat element, which is arranged coaxially with the primary rotation axis. The input plate preferably has at least one planar region arranged perpendicularly to the primary rotation axis. In this context, the term "flat" shall be understood to mean in particular that a maximum axial extension of the input plate is in particular less than 70%, preferably less than 50%, and particularly preferably less than 30% of a diameter of the input plate. The input plate is preferably formed in one piece. The input plate is preferably formed as a shaped component. The input plate can, in principle, also be formed in a number of parts. An advantageously efficient and compact arrangement of a dual clutch can thus be achieved.

It is further proposed that the second output plate, the second force transfer region, the first input plate, the first output plate, and the connection plate are arranged successively in the stated order in the axial direction. At least an imaginary straight line, running parallel to the primary rotation axis, preferably first intersects the second output plate, then the second force transfer region, then the first input plate, then the first output plate, and then the connection plate. An advantageously efficient and compact arrangement of a dual clutch can thus be achieved.

It is further proposed that the dual clutch transmission has a first actuation oil flow for actuating the first clutch, said flow being guided through the input shaft. The dual clutch transmission also has a first centrifugal oil flow, which is guided through the input shaft. The first centrifugal oil flow is preferably coupled to a first centrifugal oil chamber of the first clutch. The first actuation oil flow is furthermore preferably coupled to the first actuation chamber of the first clutch. The first actuation oil flow and the first centrifugal oil flow are preferably supplied axially through the second input shaft to the first clutch from the side of the internal combustion engine.

The dual clutch transmission furthermore preferably has a second actuation oil flow and a second centrifugal oil flow, which are supplied to the second clutch axially from the side of the internal combustion engine through the second input shaft. The second centrifugal oil flow is preferably coupled to a second centrifugal oil chamber of the second clutch. The second actuation oil flow is furthermore preferably coupled to the second actuation chamber of the second clutch. A particularly advantageous oil guidance can thus be achieved.

It is furthermore proposed that the first actuation piston is arranged axially between the first force transfer region and the sub-transmissions. The first actuation piston is preferably arranged axially between the first input plate and the first output plate. The first actuation piston is arranged in a manner at least partially radially overlapping the second force transfer region. An actuation direction of the first actuation piston preferably points from the sub-transmissions in the direction of the internal combustion engine. An advantageously efficient and compact arrangement of a dual clutch can thus be achieved.

It is additionally proposed that the second actuation piston is arranged axially between the second force transfer region and the sub-transmissions. The second actuation piston is preferably arranged axially between the second output plate and the first input plate. The second actuation piston is preferably arranged in a manner at least partially radially overlapping the first actuation piston. An actuation direction of the second actuation piston preferably points in particular from the sub-transmissions in the direction of the internal combustion engine. An advantageously efficient and compact arrangement of a dual clutch can thus be achieved.

Further advantages will become clear from the following FIGURE description. The FIGURE shows an exemplary embodiment of the invention. The FIGURE, the FIGURE description, and the claims contain numerous features in combination. A person skilled in the art will expediently also consider the features individually and combine them to form meaningful further combinations.

BRIEF DESCRIPTION OF THE DRAWING FIGURE

The sole FIGURE shows a schematic depiction of a dual clutch transmission according to the invention.

DETAILED DESCRIPTION

The sole FIGURE shows a dual clutch transmission 10. The dual clutch transmission 10 is formed by a hybrid dual clutch transmission. The dual clutch transmission 10 comprises a first, schematically depicted, sub-transmission 12. The dual clutch transmission 10a comprises a second, schematically depicted, sub-transmission 14. The first sub-transmission 12 is provided for engagement of gears denoted by odd numbers. The first sub-transmission 12 has a first sub-transmission input shaft W1. The first sub-transmission input shaft W1 is formed as an inner input shaft. A second sub-transmission input shaft W2 is arranged coaxially with and radially surrounding the first sub-transmission input shaft W1. The first sub-transmission shaft W1 is formed as a hollow shaft. However, it is also conceivable to form a first sub-transmission W1 as a solid shaft. The second sub-transmission 14 is provided for engagement of gears denoted by even numbers. The second sub-transmission 14 has the second sub-transmission input shaft W2. The second sub-transmission input shaft W2 is formed as a hollow shaft. The first sub-transmission 12 and the second sub-transmission 14 also have a plurality of shift units, not depicted in greater detail. The shift units are provided to produce shiftable connections between transmission shafts, fixed gears and/or idler gears of the sub-transmissions 12, 14. In principle, however, it is also conceivable that the first sub-transmission 12 is provided for engagement of gears denoted by even numbers and the second sub-transmission 14 is provided for engagement of gears denoted by odd numbers. The second sub-transmission input shaft W2 is advantageously arranged radially outside the first sub-transmission input shaft W1 and/or the first sub-transmission input shaft W1 is formed as an inner sub-transmission input shaft and the second sub-transmission input shaft W2 is formed as an outer sub-transmission input shaft. A high installation space efficiency can hereby be achieved. Furthermore, an advantageous dual clutch design can be made possible. The dual clutch transmission 10 has an input shaft W0. The input shaft W0 is coupled to a dual mass flywheel 34. The dual mass flywheel is coupled to an internal combustion engine 36. The dual mass flywheel 34 is provided to reduce torsional vibrations of the internal combustion engine 36. The input shaft W0 is provided to be driven by the internal combustion engine 36. The dual clutch transmission 10 comprises a primary rotation axis 38. The sub-transmission input shaft W1, the sub-transmission input shaft W2 and the input shaft W0 are arranged concentrically with the primary rotation axis 38.

The dual clutch transmission 10 comprises a transmission housing, not shown in greater detail. The dual clutch transmission 10 has a first clutch K1. The first clutch K1 is associated with the first sub-transmission 12. The first clutch K1 is formed as a multi-disc clutch. The dual clutch transmission 10 has a second clutch K2. The second clutch K2 is associated with the second sub-transmission 14. The second clutch K2 is formed as multi-disc clutch. The first clutch K1 and the second clutch K2 are arranged stacked radially one above the other. The second clutch K2 is arranged radially inside the first clutch K1. The first clutch K1 and the second clutch K2 are arranged at least substantially in the same axial extension region.

The first clutch K1 has a first input disc carrier K11, a first output disc carrier K12, a first force transfer region K13, and a first actuation piston B11. The first input disc carrier K11 is formed by a first inner disc carrier. The first output disc carrier K12 is embodied as a first outer disc carrier. The first force transfer region K13 is formed by a region of the inner discs and the outer discs of the first clutch K1. The first force transfer region K13 is formed by a disc set. The first clutch K1 has a first actuation unit B1, which has the first actuation piston B11. The second clutch K2 has a second input disc carrier K21, a second output disc carrier K22, a second force transfer region K23, and a section actuation piston B21. The second input disc carrier K21 is formed by a second outer disc carrier. The second output disc carrier K22 is formed by a second inner disc carrier. The second force transfer region K23 is formed by a region of the inner discs and the outer discs of the second clutch K2. The second force transfer region K23 is formed by a disc set. The second clutch K2 has a second actuation unit B2, which has the second actuation piston B21. The first force transfer region K13 is arranged in a manner radially surrounding and axially at least partially overlapping the second force transfer region K23.

The first actuation unit B1 is arranged radially at least in part in a region of the first force transfer region K13. The first actuation unit B1 is arranged axially at least partially outside the first force transfer region K13. The first actuation unit B1 is arranged axially on a side of the first force transfer region K13 facing the sub-transmissions 12, 14. The first actuation unit B1a is provided for hydraulic actuation of the first clutch K1. A first centrifugal oil flow B15 can be supplied to the first actuation unit B1. The first centrifugal oil flow B15 can be supplied to the first actuation unit B1 from the side of the first actuation unit B1 facing the internal combustion engine 36. The first actuation unit B1 comprises the first actuation piston B11. The first actuation piston B11 is arranged in an axially movable manner. The first actuation unit B1 has a first actuation chamber B12. The first actuation chamber B12 is arranged substantially axially on a side of the first force transfer region K13 facing away from the internal combustion engine 36. A first actuation oil can be supplied to the first actuation chamber B12 by means of a first actuation oil flow B13. A first actuation oil pressure can be built up in the first actuation chamber B12. An axial position of the first actuation piston B11 can be controlled by means of the first actuation oil pressure. At a high first actuation oil pressure in the first actuation chamber B12, the first actuation piston B11 is provided in order to close the first clutch K1. At a low first actuation oil pressure in the first actuation chamber B12, a first return spring, not shown in greater detail, is provided in order to remove the first actuation piston B11 from the first clutch K1. The first actuation piston B11 delimits the first actuation chamber B12 axially from a side facing the internal combustion engine 36. The first actuation unit B1 also has a first centrifugal oil chamber B14. The first centrifugal oil chamber B14 is arranged on a side of the first actuation piston B11 arranged opposite the first actuation chamber B12. A first centrifugal oil can be supplied to the first centrifugal oil chamber B14 by means of the first centrifugal oil flow B15, in particular in an open state of the first clutch K1. The first centrifugal oil chamber B14 is provided for a centrifugal force equalization. Part of the first centrifugal oil chamber B14 is designed as a first piston guide chamber of the first actuation piston B11.

The first actuation piston B11 is arranged, considered in the axial direction, at least in part on a side of the first force transfer region K13 facing the sub-transmissions 12, 14. The first actuation piston B11 is arranged axially between the first force transfer region K13 and the sub-transmissions 12, 14. The first actuation piston B11 is arranged axially between a first input plate 44 and a first output plate 46. The first actuation piston B11 is arranged, considered in the axial direction, on a side of the first force transfer region K13 facing away from the internal combustion engine 36. The first actuation piston B11 is arranged radially overlapping the second force transfer region K23.

The second actuation unit B2 is arranged radially at least partially in a region of the second force transfer region K23. The second actuation unit B2 is arranged axially at least substantially outside the second force transfer region K23. The second actuation unit B2 is arranged axially on a side of the second force transfer region K23 facing away from the internal combustion engine 36. The second actuation unit B2 is provided for hydraulic actuation of the second clutch K2. A second centrifugal oil flow B25 can be supplied to the second actuation unit B2. The second actuation unit B2 comprises the second actuation piston B21. The second actuation piston B21 is arranged in an axially movable manner. The second actuation unit B12 has a second actuation chamber B22. The second actuation chamber B22 is arranged axially at least substantially outside the second force transfer region K23. The second actuation chamber B22 is arranged axially on a side of the second clutch K2 facing away from the internal combustion engine 36. A second actuation oil can be supplied to the second actuation chamber B22 by means of a second actuation oil flow B23. A second actuation oil pressure can be built up in the second actuation chamber B22. An axial position of the second actuation piston B21 can be controlled by means of the second actuation oil pressure. At a high second actuation oil pressure in the second actuation chamber B22, the second actuation piston B21 is provided in order to close the second clutch K2. At a low second actuation oil pressure in the second actuation chamber B22, a second return spring, not shown in greater detail, is provided in order to remove the second actuation piston B21 from the second clutch K2. The second actuation piston B21 delimits the second actuation chamber B22 axially to a side facing the internal combustion engine 36. The second actuation unit B2 also has a second centrifugal oil chamber B24. The second centrifugal oil chamber B24 is arranged on a side of the second actuation piston B21 arranged opposite the second actuation chamber B22. A second centrifugal oil can be supplied to the second centrifugal oil chamber B24 by means of the second centrifugal oil flow B25, in particular in an open state of the second clutch K2. The second centrifugal oil chamber B24 is provided for a centrifugal force equalization. Part of the second centrifugal oil chamber B24 is designed as a second piston guide chamber of the second actuation piston B21.

The second actuation piston B21 is arranged axially between the second force transfer region K23 and the sub-transmissions 12, 14. The second actuation piston B21 is arranged axially between a second output plate 28 and the first input plate 44.

The first centrifugal oil chamber B14 and the second centrifugal oil chamber B24 are arranged at least substantially in the same radial extension region. The first actuation chamber B12, the second actuation chamber B22, the first centrifugal oil chamber B14 and the second centrifugal oil chamber B24 are arranged at least substantially in the same radial extension region.

Furthermore, the dual clutch transmission 10 has a connection plate 16, which radially overlaps the first force transfer region K13, is connected to the second sub-transmission input shaft W2 for fixedly conjoint rotation, and extends radially starting from the second sub-transmission input shaft W2 and is arranged axially between the sub-transmissions 12, 14 and the force transfer regions K13, K23. The connection plate 16 is formed by a rotationally symmetrical, disc-shaped component. The connection plate 16 is formed in one piece. The connection plate 16 is fixedly connected to the second sub-transmission input shaft W2 at an end of the second sub-transmission input shaft W2 facing the internal combustion engine 36. The connection plate 16 is arranged coaxially with the sub-transmission input shaft W2.

Furthermore, the dual clutch transmission 10 comprises a plurality of seal elements, of which two seal elements 40, 42 are provided with a reference sign by way of example in FIG. 1. The seal elements 40, 42 are provided to seal gaps between components of the actuation units B1, B2 with respect to an actuation oil.

A first actuation oil flow B13 is provided for actuation of the first clutch K1 and is guided through the input shaft W0. The first actuation oil flow B13 and the first centrifugal oil flow B15 are guided to the first clutch K1 axially from the side of the internal combustion engine through the input shaft W0. The first centrifugal oil flow B15 is coupled to the first centrifugal oil chamber B14 of the first clutch K1. The first actuation oil flow B13 is also coupled to the first actuation chamber B12 of the first clutch K1. A second actuation oil flow B23 and the second centrifugal oil flow B25 are supplied to the second clutch K2 axially from the side of the internal combustion engine through the input shaft W0. The second centrifugal oil flow B25 is coupled to the second centrifugal oil chamber B24 of the second clutch K2. Furthermore, the second actuation oil flow B23 is coupled to the second actuation chamber B22 of the second clutch K2.

The first actuation chamber B12 is delimited by a first wall 30, which is connected to the first input shaft W0 for fixedly conjoint rotation. The first wall 30 is formed by a rotationally symmetrical, disc-shaped element. The first wall 30 is connected fixedly to the input shaft W0 at a free end of the input shaft W0 facing away from the internal combustion engine 36. The first wall 30 is arranged coaxially with the input shaft W0, in particular the primary rotation axis 38. The first wall 30 is arranged on a side of the first actuation chamber B12 facing the sub-transmissions 12, 14. The first actuation chamber B12 is arranged between the first wall 30 and the first actuation piston B11. The first actuation chamber B12 is delimited radially inwardly by the input shaft W0. The first actuation chamber B12 is arranged radially overlapping the second actuation chamber B22.

The dual clutch transmission 10 also has a cylinder portion 24, which is connected to the second output disc carrier K22 for fixedly conjoint rotation and which is arranged radially surrounding and axially at least partially overlapping the first output disc carrier K12. The cylinder portion 24 is connected to the second sub-transmission input shaft W2 for fixedly conjoint rotation via the connection plate 16. The cylinder portion 24 is fixedly connected to the connection plate 16.

The second centrifugal oil chamber B24 is delimited by a second wall 32, which is connected to the input shaft W0 for fixedly conjoint rotation. The second wall 32 is formed by a rotationally symmetrical, disc-shaped element. The second wall 32 is fixedly connected to the input shaft W0 on a side of the first input plate 44 facing the internal combustion engine 36. The second wall 32 is arranged coaxially with the input shaft W0, in particular the primary rotation axis 38. The second wall 32 is arranged on a side of the second centrifugal oil chamber B24 facing away from the sub-transmissions 12, 14. The second centrifugal oil chamber B24 is arranged between the second wall 32 and the second actuation piston B21. The second centrifugal oil chamber B24 is delimited radially inwardly by the input shaft W0. The second centrifugal oil chamber B24 is arranged radially overlapping the second actuation chamber B22.

The input shaft W0, the first input disc carrier K11, and the second disc carrier K21 are connected to one another for fixedly conjoint rotation. The dual clutch transmission 10 has the first input plate 44, which is arranged coaxially with the input shaft W0 and by means of which the first input disc carrier K11 is connected to the input shaft W0 for fixedly conjoint rotation. By means of the first input plate 44, the first input disc carrier K11 and the second input disc carrier K21 are connected to the input shaft W0 for fixedly conjoint rotation. The first input plate 44 is arranged axially between the sub-transmissions 12, 14 and the first force transfer region K13. The first input plate 44 is arranged axially between the first force transfer region K13 and the sub-transmissions 12, 14. The first input plate 44 is arranged in a manner radially overlapping the second force transfer region K23. The input plate 44 is formed in one piece. The input plate 44 is formed particularly advantageously as a shaped or, particularly advantageously, forged component. The first input plate 44 delimits the first centrifugal oil chamber B14 in the axial direction on a side facing away from the sub-transmissions 12, 14.

The second actuation chamber B22 is delimited by the first input plate 44. The second actuation chamber B22 is arranged between the first input plate 44 and the second actuation piston B21. The second actuation chamber B22 is delimited radially inwardly by the input shaft W0.

The first output disc carrier K12 is connected to the first sub-transmission input shaft W1 for fixedly conjoint rotation. The dual clutch transmission 10 has the first output plate 46, which is arranged coaxially with the input shaft W0 and by means of which the first output disc carrier K12 is connected to the first sub-transmission input shaft W1 for fixedly conjoint rotation. The first output plate 46 is arranged axially between the sub-transmissions 12, 14 and the first force transfer region K13. The first output plate 46 is arranged radially overlapping the first force transfer region K13. The first output plate 46 is connected to the first sub-transmission input shaft W1 axially between the first wall 30 and the connection plate 16.

The second output plate 28, the second force transfer region K23, the first input plate 44, the first output plate 46, and the connection plate 16 are arranged successively in the stated order in the axial direction.

The second output disc carrier K22 is connected to the second sub-transmission input shaft W2 for fixedly conjoint rotation. The dual clutch transmission 10 has a second output plate 28. The second output plate 28 is connected to the second output disc carrier K22 for fixedly conjoint rotation and is connected to the cylinder portion 24 for fixedly conjoint rotation. The second output plate 28 is arranged axially on a side of the second force transfer region K23 facing away from the sub-transmissions 12, 14. By means of the second output plate 28, the second output disc carrier K22 is connected to the second sub-transmission input shaft W2 for fixedly conjoint rotation. The second output plate 28 is arranged radially overlapping the second force transfer region K23. The second output plate is arranged axially between the second force transfer region K23 and the internal combustion engine 36. The second output plate 28 extends radially outwardly from an attachment point to the second output disc carrier K22. The second output plate 28 is connected to the second sub-transmission input shaft W2 for fixedly conjoint rotation via the cylinder portion 24 and via the connection plate 16.

Furthermore, the dual clutch transmission 10 has an electric machine 18. The electric machine 18 has a stator 48 and rotor 20. The electric machine 18 is used to provide a hybridization of the dual clutch transmission 10. The dual clutch transmission 10 also has an attachment element 22, which is connected to the second output disc carrier K22 for fixedly conjoint rotation and which is provided for torque-transmitting attachment of the electric machine 18. The attachment element 22 is also connected to the second sub-transmission input shaft W2 for fixedly conjoint rotation. The attachment element 22 is arranged in a manner radially surrounding the first output disc carrier K12 and axially at least partially overlapping the first actuation piston B11. The rotor 20 has a drive element, which is provided to cooperate with the attachment element 22, wherein the attachment element 22 is formed by an output element. The attachment element 22 is provided for an, in particular torque-transmitting, attachment of the rotor 20 of the electric machine 18 to the dual clutch transmission 10. The cylinder portion 24 is also fixedly connected to the attachment element 22. The electric machine 18 is attached to the cylinder portion 24 via the attachment element 22.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 dual clutch transmission
12 sub-transmission
14 sub-transmission
16 connection plate
18 electric machine
20 rotor
22 attachment element
24 cylinder portion
28 output plate
30 wall
32 wall
34 dual mass flywheel
36 internal combustion engine
38 primary rotation axis
40 seal element
42 seal element
44 input plate
46 output plate
48 stator
B1 actuation unit
B11 actuation piston
B12 actuation chamber
B13 actuation oil flow
B14 centrifugal oil chamber
B15 centrifugal oil flow
B2 actuation unit
B21 actuation piston
B22 actuation chamber
B23 actuation oil flow
B24 centrifugal oil chamber
B25 centrifugal oil flow
K1 clutch
K11 input disc carrier
K12 output disc carrier
K13 force transfer region
K2 clutch
K21 input disc carrier
K22 output disc carrier
K23 force transfer region
W0 input shaft
W1 sub-transmission input shaft
W2 sub-transmission input shaft

The invention claimed is:

1. A dual clutch transmission, comprising:
   an input shaft;
   a first clutch having a first input disc carrier, a first output disc carrier, a first force transfer region, and a first actuation piston;
   a second clutch having a second input disc carrier, a second output disc carrier, a second force transfer region, and a second actuation piston;
   a first sub-transmission having a first sub-transmission input shaft;
   a second sub-transmission, which has a second sub-transmission input shaft; and
   a cylinder portion connected to the second output disc carrier for fixedly conjoint rotation and being arranged radially surrounding and axially at least partially overlapping the first output disc carrier,
   wherein the input shaft, the first input disc carrier, and the second input disc carrier are connected to one another for fixedly conjoint rotation, wherein the first output disc carrier is connected to the first sub-transmission input shaft for fixedly conjoint rotation, wherein the second output disc carrier is connected to the second sub-transmission input shaft for fixedly conjoint rotation, wherein the second sub-transmission input shaft is arranged coaxially with and radially surrounding the first sub-transmission input shaft, and wherein the first force transfer region is arranged radially surrounding and axially at least partially overlapping the second force transfer region.

2. The dual clutch transmission of claim 1, further comprising:

a connection plate, which radially overlaps the first force transfer region, is connected to the second sub-transmission input shaft for fixedly conjoint rotation, and extends radially starting from the second sub-transmission input shaft, and which is arranged axially between the sub-transmissions and the force transfer regions.

3. The dual clutch transmission of claim 1, wherein the second output disc carrier is an inner disc carrier.

4. The dual clutch transmission of claim 1, further comprising:

an electric machine; and an attachment element connected to the second output disc carrier for fixedly conjoint rotation and which is provided for torque-transmitting attachment of the electric machine.

5. The dual clutch transmission of claim 1, wherein the first output disc carrier is an outer disc carrier.

6. The dual clutch transmission of claim 1, further comprising:

a second output plate, connected to the second output disc carrier for fixedly conjoint rotation and connected to the cylinder portion for fixedly conjoint rotation and arranged axially on a side of the second force transfer region facing away from the sub-transmissions.

7. The dual clutch transmission of claim 6, further comprising:

a first output plate arranged coaxially with the input shaft and connecting the first output disc carrier to the first sub-transmission input shaft for fixedly conjoint rotation, wherein the first output plate is arranged axially between the first and second sub-transmissions and the first force transfer region.

8. The dual clutch transmission of claim 7, further comprising:

a first input plate arranged coaxially with the input shaft and connecting the first input disc carrier to the input shaft for fixedly conjoint rotation, wherein the first input plate is arranged axially between the first and second sub-transmissions and the first force transfer region.

9. The dual clutch transmission of claim 7, wherein the second output plate, the second force transfer region, the first input plate, the first output plate, and the connection plate are arranged successively in the stated order in the axial direction.

10. The dual clutch transmission of claim 1, wherein a first actuation oil flow actuates the first clutch, wherein the first actuation oil flow is guided through the input shaft.

11. The dual clutch transmission of claim 1, wherein the first actuation piston is arranged axially between the first force transfer region and the first and second sub-transmissions.

12. The dual clutch transmission of claim 1, wherein the second actuation piston is arranged axially between the second force transfer region and the first and second sub-transmissions.

* * * * *